United States Patent
Heemskerk et al.

(10) Patent No.: US 6,628,584 B1
(45) Date of Patent: Sep. 30, 2003

(54) APPARATUS AND ASSOCIATED METHOD FOR LINKING INFORMATION ON A READ ONLY RECORD CARRIER

(75) Inventors: Jacobus Peterus Josephus Heemskerk, Eindhoven (NL); Roel Van Woudenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 372 days.

(21) Appl. No.: 09/691,336

(22) Filed: Oct. 18, 2000

(30) Foreign Application Priority Data

Oct. 20, 1999 (EP) .............................. 99203443
Jan. 7, 2000 (EP) .............................. 00200047

(51) Int. Cl.$^7$ ................................ G11B 7/00
(52) U.S. Cl. .................. 369/47.1; 369/275.3
(58) Field of Search ............... 369/53.21, 47.1, 369/275.3, 59.1, 53.16, 47.12

(56) References Cited

U.S. PATENT DOCUMENTS

| 5,187,699 A | | 2/1993 | Raaymakers et al. |
| 6,091,686 A | * | 7/2000 | Caffarelli et al. ............. 369/58 |
| RE37,808 E | * | 7/2002 | Yokota .................... 369/47.12 |

FOREIGN PATENT DOCUMENTS

| EP | 0724263 A2 | 7/1996 |
| EP | 0730274 A2 | 9/1996 |
| JP | 11328864 | 11/1999 |

\* cited by examiner

Primary Examiner—Nabil Hindi
(74) Attorney, Agent, or Firm—Michael E. Belk

(57) ABSTRACT

A record carrier of a read-only type has information in a track. The information is subdivided in addressable blocks and a number of blocks constitute an information unit. The information unit is the minimal unit for error correction according to a format for writable record carriers. On the read-only record carrier a linking area is provided between information units. This has the advantage that compatibility with recordable record carriers is improved.

12 Claims, 2 Drawing Sheets

APPARATUS AND ASSOCIATED METHOD FOR LINKING INFORMATION ON A READ ONLY RECORD CARRIER

BACKGROUND OF THE INVENTION

1. Technical Field

The invention relates to a record carrier of a read-only type comprising information in a track.

The invention further relates to a method of manufacturing a record carrier of a read-only type in which method an information layer of the record carrier is provided with marks constituting a track representing information.

The invention further relates to a read device for reading the record carrier.

2. Related Art

Record carriers of a read-only type are well-known, e.g. the Compact Disc (CD). Such read-only type record carriers are manufactured in a mass production process, e.g. for optical record carriers by stamping replicas from a master disc. Hence the information is applied to the record carrier in one step, and the track has a single, continuing pattern of marks representing said information. The information is logically subdivided in addressable blocks of data words and corresponding control words, e.g. addresses. An addressable block is the amount of data words which is logically handled as one item of data, e.g. 2048 bytes. Hence the addressable blocks constitute logical amounts of user data which can be retrieved individually, e.g. computer data on a CD-ROM. On the other hand recordable-type record carriers are known, e.g. CD-R or CD-RW. Recordable-type record carriers are usually provided with information in a recording device by writing information signals in a preformed track consecutively or random at selected locations. Such recording in different sessions in time may take place in one recording device or in different recorders. The recording in different sessions of information signals adjacently in the track is called linking. A method and apparatus for linking successively recorded information signals on a recordable record carrier is known from U.S. Pat. No. 5,187,699. The minimal amount of information which has to be recorded without interruption by such an information signal is inter alia determined by the error correction system. Such amount is called an information unit and comprises a number of the logically addressable blocks, at least one but usually 8 or 16, and Error Correcting Codes (ECC) covering said blocks. Information units are to be recorded at predefined locations indicated by position information in the pregroove. Hence in between information units there may be a boundary between signals recorded at different instants, called a link position. In the known linking method, after a first information signal is completely recorded, the recording process is continued for a predetermined period after a last frame of the signal up to the link position. When a next information signal is to be recorded, the recording process is started at the link position by adding dummy information (usually zero data) up to the start of the following predefined location. Hence the area between the information units does not contain valid information, and is called a linking area, which linking area includes said link position. Usually the rules for the storage of information in the track on a record carrier are called a format, e.g. a format for recordable type record carriers. A problem is, that read devices for reading several record carrier types must first distinguish between the read-only type and the recordable type before the read signal can be decoded according to the correct format. Simple read devices which are equipped only to read the format of the record carriers of the read-only type may be disturbed when such a linking area is read, which results in errors in the output signals.

SUMMARY OF THE INVENTION

It is an object of the invention to provide a record carrier and read device which allow effective linking and obviate the above problems.

For this purpose, the read-only type record carrier as described in the opening paragraph has a track comprising the information subdivided in information units that are constituted by a predetermined number of addressable blocks, which track further comprises linking areas provided between the information units according to a format for recordable type record carriers. Further the device as described in the opening paragraph is provided with signal processing means for retrieving the information and discarding the linking area. The effect of the linking area in the read-only type record carrier is, that read devices need only be equipped for reading one format and can read the recordable discs without any disruption of the read process, because the linking area is part of the format. Further the compatibility between different types of record carriers is improved because the storage capacity of the read-only type record carrier is not larger than the capacity of the recordable type due to the presence of linking areas in both types, and because the relation between logical addresses of blocks and their physical locations can be the same in both types.

The invention is also based on the following recognition. Usually a lot of effort is required to provide linking for recordable type record carriers which are to be compatible to read-only type record carriers. Such a linking system may require a highly accurate recording device to create only a small linking area which can be dealt with by the error correcting system provided in players for read-only record carriers. By providing the linking area already in the read-only type disc format the read device is less complicated because only one format needs to be decoded. Further the recording device does not require a high accuracy linking circuit, but may create a normal size linking area.

A preferred embodiment of the record carrier is characterized in that the information is encoded by a channel code to an encoded signal comprising frames and in that the linking area comprises two frames. This has the advantage, that the first frame of the linking area may be used in a recording system to facilitate a run-out area for the previous information unit, while the second frame facilitates a run-in area for the next information unit. Hence a minimal loss of capacity is accomplished.

In a further embodiment of the record carrier at least one linking area comprises auxiliary information. This has the advantage, that the auxiliary information is exclusively available for read-only record carriers, for example copy protection keys, and cannot be easily copied to a recordable type record carrier, because on standard recording devices the contents of the linking area cannot be influenced externally.

Further advantageous, preferred embodiments according to the invention are given in the further dependent claims.

BRIEF DESCRIPTION OF THE DRAWINGS

These and other aspects of the invention will be apparent from and elucidated further with reference to the embodiments described by way of example in the following description and with reference to the accompanying drawings, in which.

Corresponding elements in different Figs. have identical reference numerals.

DETAILED DESCRIPTION OF THE INVENTION

Figures 1A, 1B:
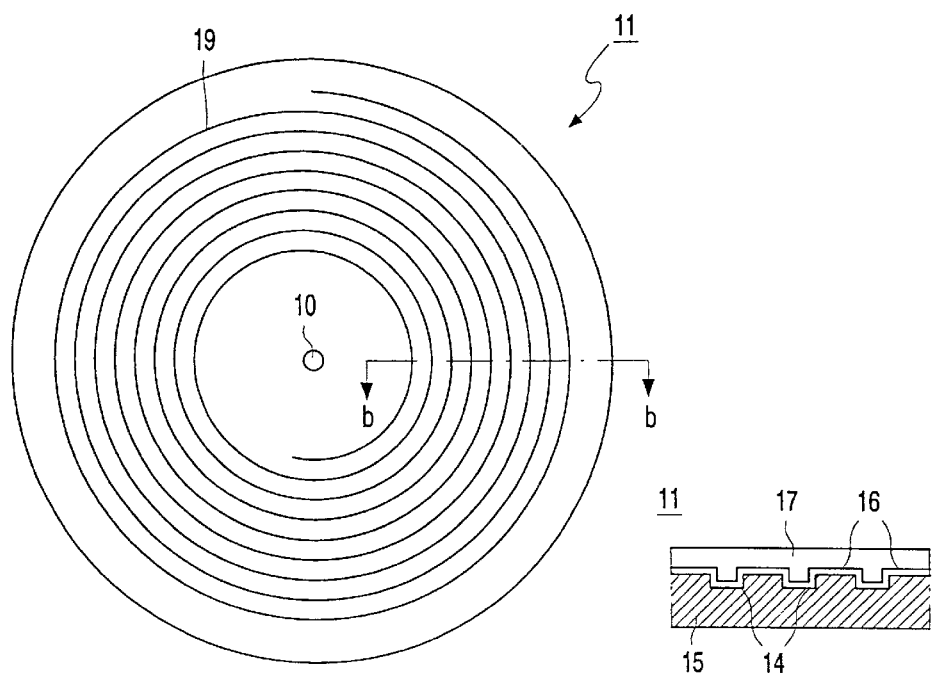
FIG. 1 shows a record carrier.

FIG. 1a shows a disc-shaped record carrier 11 having a track 19 and a central hole 10. The track 19 is arranged in accordance with a spiral pattern of turns constituting substantially parallel tracks on an information layer. The record carrier is optically readable, called an optical disc, and is of read only type. The information is represented on the information layer by optically detectable marks along the track, e.g. indentations manufactured by pressing. The track comprises position information, e.g. addresses, for indication of the location of data blocks. A number of blocks constitute an information unit, which unit is provided with error correcting codes and is the minimally required amount of data for an error correcting process in a read device.

FIG. 1b is a cross-section taken along the line b—b of the record carrier 11, in which a transparent substrate 15 is provided with a reflecting layer 16 and a protective layer 17. The track 14 may be implemented as an indentation or an elevation, and marks are provided along the longitudinal direction of the track representing the information.

The record carrier 11 carries information represented by marks, which result in a modulated signal when optically detected. The modulated signal is subdivided in frames. A frame is a predefined amount of data preceded by a synchronizing signal. Usually such frames also comprise error correction codes, e.g. parity words, which however are related to a number of data blocks, i.e. a large number of frames. An example of such a recording system is known from the DVD system, in which the frames carry 172 data words and 10 parity words, which example is used in the description below. The data is organized in blocks of 2 KB and in information units comprising 16 blocks, hence the size of such a unit is 32 KB user data. The unit comprises a number of frames which contain Error Correction Codes (ECC) for correcting errors in the user information in the unit, and it contains 2 layers of error correction. The first layer of error correction (called C1) corrects small errors like random errors, and the second layer (called C2) corrects the large error such as burst errors. A recording device should be able to write and/or rewrite such a block independently. Therefore a block is preceded by a run-in area not containing user data, but a dedicated pattern for settling the read-out electronics (e.g. gain, frequency and phase of the PLL). Further the block usually is also provided with a run-out area to prevent an abrupt ending of the read signal, which might disturb the read electronics. So for recordable record carriers a linking area is available between the units. The size of the linking area may be equal to a data block or even an information unit. According to the invention the linking area is introduced in the read-only record carrier having the same or similar contents as the writable record carrier. Advantageously the read device does not have to detect which type of record carrier is to be read, as the format of data storage is equal. In an embodiment the linking area consists of 2 frames. There will always be some errors on a link position but errors when stopping the recording of a unit can be positioned in the first frame, while errors due to starting a recording can be positioned in the second frame. In a further embodiment the linking area is subdivided in a run-out field following the previous data block, a gap and a run-in field preceding the next data block.

Figure 2:
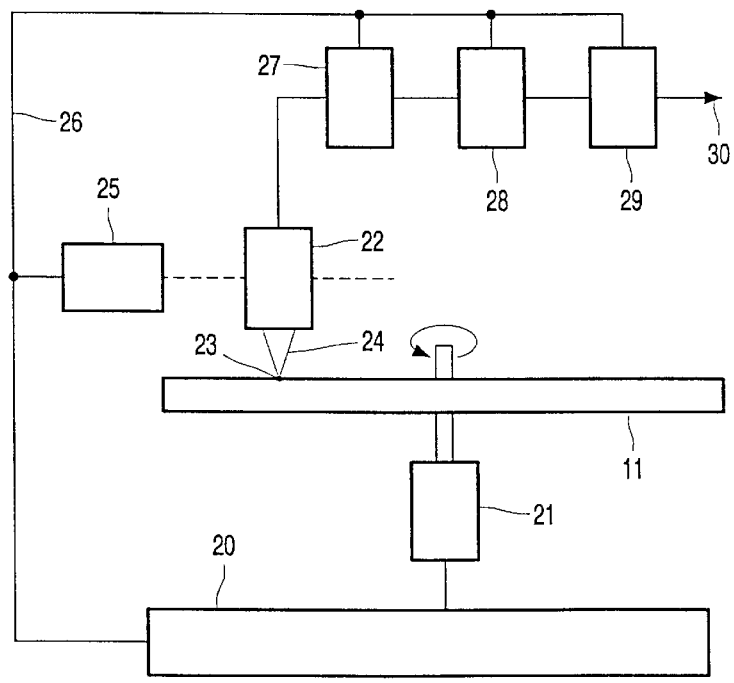
FIG. 2 shows a reading device.

FIG. 2 shows a playback device for reading a record carrier 11, which record carrier is identical to the record carrier shown in FIG. 1. The device is provided with a drive unit 21 for rotating the record carrier 1, and a read head 22 for scanning the track 19 on the record carrier. The apparatus is provided with a positioning unit 25 for coarsely positioning the read head 22 on the track in the radial direction (perpendicular to the length direction of the track). The read head comprises an optical system of a known type for generating a radiation beam 24 guided through optical elements and focused to a radiation spot 23 on a track of the information layer of the record carrier. The radiation beam 24 is generated by a radiation source, e.g. a laser diode. The read head further comprises a focusing actuator for moving the focus of the radiation beam 24 along the optical axis of said beam and a tracking actuator for fine positioning of the spot 23 in a radial direction on the center of the track. The tracking actuator may comprise for example coils for radially moving an optical element or a piezo element for changing the angle of a reflecting element with respect to the optical axis of the beam 24. The radiation reflected by the information layer is detected by a detector of a usual type, e.g. a four-quadrant diode, in the read head 22 for generating a read signal and further detector signals including a tracking error and a focusing error signal, which are applied to said tracking and focusing actuators. The read signal is processed by a read means 27 to retrieve the data, which read means are of a usual type for example comprising a channel decoder. The retrieved data is passed to a data selector 28. The data selector selects the information units and skips the read signal from the linking areas in between the information units. The selected data is passed on to the error correction unit 29 which perform the error correction to generate an output signal 30. In a different embodiment there is no separate data selector, but the error correction unit is provided with a frame detector which detects the frames on the read signal, and discards the linking frames and combines the frames constituting an information unit. The device is further provided with a control unit 20 for receiving commands from a user or from a host computer for controlling the apparatus via control lines 26, e.g. a system bus, connected to the drive unit 21, the positioning unit 25, the read means 27 and the data selector 28, and possibly also the error correction unit 29. To this end, the control unit 20 comprises control circuitry, for example a microprocessor, a program memory and control gates, for performing the usual control procedures. The control unit 20 may also be implemented as a state machine in logic circuits.

Figure 3:
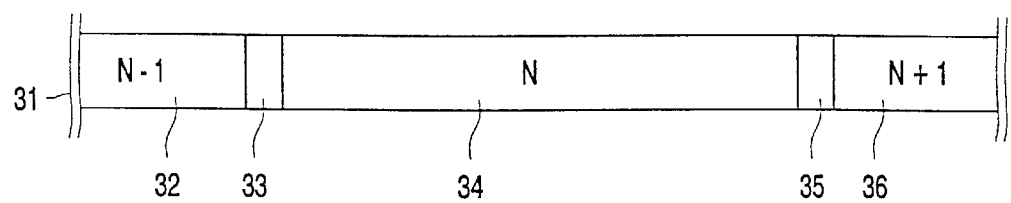
FIG. 3 shows a number of linked information units.

FIG. 3 shows a number of linked information units. A part of a logical sequence 31 of information units is indicated. A first information unit 32 is named N−1, and followed by a linking area 33. Thereafter a next information unit 34 is named N, followed by a further linking area 35 and a third information unit 36 named N+1. Each pair of information units is separated by a linking area, and therefore in a recordable system a compatible record carrier can be recorded without difficulties. It must be noted that the sequence as shown in FIG. 3 is present on a read-only record carrier which does not require any linking areas. However, as the playback device is arranged to cope with the linking areas, any recorded record carrier can easily be read on the same device. In an embodiment the linking area has a length of two frames as described above with reference to FIG. 1.

Figure 4:
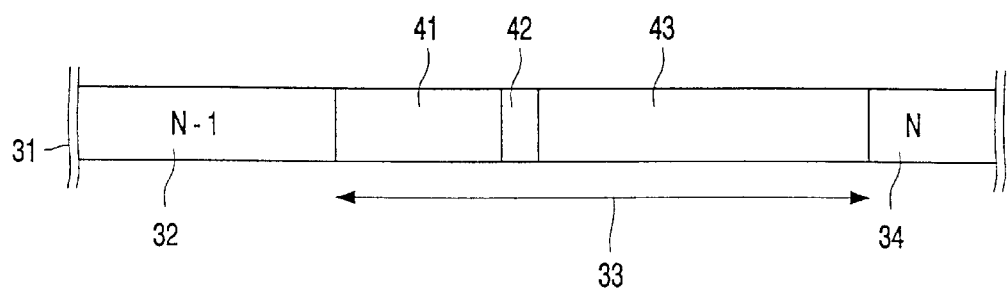
FIG. 4 shows a linking area.

FIG. 4 shows a linking area. A detail of the logical sequence 31 of information units is indicated. The preceding information unit 32 is named N−1, and followed by the linking area 33 and the next information unit 34 named N. The linking area 33 is subdivided in a run-out field 41 adjacent to the preceding unit 32, a gap 42, and a run-in field 43 immediately before the data area of the next unit N. The run-in field and the run-out field may be filled with a predetermined pattern of marks, usually short marks for synchronizing a read clock when reading. The gap 42 does not have a specific prescribed data content in the recordable type record carrier, because it remains unrecorded. When recording several information units consecutively the gap may also be recorded. In the read-only disc the gap may be an unrecorded area or may have some random data pattern. For recording the gap has the advantage, that the run-out field and the run-in field do not overlap and therefor are reliable and without unexpected errors. In a further embodiment the linking area in the read-only record carrier may be used to accommodate auxiliary data, e.g. access control data, a decryption key or a unique disc identification number. In particular the gap may advantageously be used to store copy control information, because on a recorder the content of the linking area cannot be influenced externally by the user and in particular the gap cannot be filled at all.

Although the invention has been explained by embodiments using the CD and DVD-optical recording format, it may be applied for any format for storage of units of information. For example the record carrier may also be a magnetic type disc or a tape. It is noted, that the invention may be implemented by means of both hardware and software, and that in this document the word 'comprising' does not exclude the presence of other elements or steps than those listed and the word 'a' or 'an' preceding an element does not exclude the presence of a plurality of such elements, that any reference signs do not limit the scope of the claims, that 'means' may be represented by a single item or a plurality and that several 'means' may be represented by the same item of hardware. Further, the scope of the invention is not limited to the embodiments, and the invention lies in each and every novel feature or combination of features described above.

What is claimed is:

1. Record carrier of a read-only type comprising information in a track, the information being subdivided in information units that are constituted by a predetermined number of addressable blocks, which track further comprises linking areas provided between the information units according to a format for recordable type record carriers.

2. Record carrier as claimed in claim 1, wherein the information is encoded to an encoded signal comprising frames and in that the linking area comprises two frames.

3. Record carrier of a read-only type comprising information in a track, the information being subdivided in information units that are constituted by a predetermined number of addressable blocks, which track further comprises linking areas provided between the information units according to a format for recordable type record carriers, and wherein the linking areas comprise a run-out field, a gap, and a run-in field.

4. Record carrier as claimed in claim 1, wherein at least one linking area comprises auxiliary information.

5. Method of manufacturing a record carrier of a read-only type, comprising providing an information layer of the record carrier with marks constituting a track representing information, wherein the information is subdivided in information units that are constituted by a predetermined number of addressable blocks, and wherein the track is provided with linking areas between the information units according to a format for recordable type record carriers.

6. Read device for reading a record carrier of a read-only type comprising information in a track, the information being subdivided in information units that are constituted by a predetermined number of addressable blocks, which track further comprises linking areas provided between the information units according to a format for recordable type record carriers, which device is provided with signal processing means for retrieving the information and discarding the linking areas.

7. Read device as claimed in claim 6, wherein the signal processing means comprise means for deriving auxiliary information from at least one linking area.

8. The record carrier of claim 1, wherein said record carrier does not comprise any other information in a second format that differs from said format, and wherein the record carrier is adapted to be read by a read device equipped to read only in said format.

9. The method of manufacturing the record carrier of claim 5, further comprising manufacturing said record carrier such that said record carrier does not comprise any other information in a second format that differs from said format, wherein the record carrier is adapted to be read by a read device equipped to read only in said format.

10. The read device of claim 6, wherein the read device is adapted to read only in said format.

11. Method of manufacturing a record carrier of a read-only type, comprising providing an information layer of the record carrier is provided with marks constituting a track representing information, wherein the information is subdivided in information units that are constituted by a predetermined number of addressable blocks, and wherein the track is provided with linking areas between the information units according to a format for recordable type record carriers, and wherein the linking areas comprise a run-out field, a gap, and a run-in field.

12. Read device for reading a record carrier of a read-only type comprising information in a track, the information being subdivided in information units that are constituted by a predetermined number of addressable blocks, which track further comprises linking areas provided between the information units according to a format for recordable type record carriers, which device is provided with signal processing means for retrieving the information and discarding the linking areas, and wherein the linking areas comprise a run-out field, a gap, and a run-in field.

* * * * *